United States Patent
Lai

(10) Patent No.: US 10,167,586 B2
(45) Date of Patent: Jan. 1, 2019

(54) PRODUCTION PROCESS OF ENVIRONMENT-FRIENDLY DENIM FABRIC AND PRODUCTION LINE THEREOF

(71) Applicant: Tat Fung Textile Company Limited, Hong Kong (HK)

(72) Inventor: Chi Chuen Lai, Hong Kong (HK)

(73) Assignee: Tat Fung Textile Company Limited, Hong Kong (HK)

( * ) Notice: Subject to any disclaimer, the term of this patent is extended or adjusted under 35 U.S.C. 154(b) by 483 days.

(21) Appl. No.: 14/933,000

(22) Filed: Nov. 5, 2015

(65) Prior Publication Data

US 2016/0194798 A1 Jul. 7, 2016

(30) Foreign Application Priority Data

Jan. 5, 2015 (HK) .................................. 15100060

(51) Int. Cl.
| | |
|---|---|
| *D06B 1/00* | (2006.01) |
| *D02J 11/00* | (2006.01) |
| *D06P 7/00* | (2006.01) |
| *D01H 7/92* | (2006.01) |
| *D02G 1/02* | (2006.01) |
| *D06B 9/06* | (2006.01) |
| *D06P 1/30* | (2006.01) |
| *D06B 9/02* | (2006.01) |

(Continued)

(52) U.S. Cl.
CPC ............... *D06B 1/00* (2013.01); *D01H 7/923* (2013.01); *D02G 1/0233* (2013.01); *D02J 11/00* (2013.01); *D06B 9/02* (2013.01); *D06B 9/06* (2013.01); *D06C 27/00* (2013.01); *D06P 1/30* (2013.01); *D06P 1/65118* (2013.01); *D06P 3/6025* (2013.01); *D06P 7/00* (2013.01);

(Continued)

(58) Field of Classification Search
CPC ......... D02J 11/00; D02G 1/0206; D02G 1/08; D02G 1/0233; D01H 1/10; D01H 1/11; D01H 1/00; D01H 7/92; D01H 7/923; D06B 23/00; D06B 9/02; D06B 9/06; D06B 1/00; D06B 7/08; D06B 2700/27; D06P 7/00; D06P 7/005; D06P 1/65118; D06P 3/6025; D06P 1/30; D06C 27/00

See application file for complete search history.

(56) References Cited

U.S. PATENT DOCUMENTS 3,406,006 A * 10/1968 Lindberg .................. D06B 7/08
  8/116.1
3,664,158 A *  5/1972 Skaathun .................. D06B 7/08
  26/106

(Continued)

*Primary Examiner* — Amy Vanatta

(57) ABSTRACT

The present invention provides a production process characterized in that a false twisting process is added between a spinning process and a winding process so that yarn slivers undergo excessive pre-torsion in an axial direction and twists which are same in quantity but different in twisting direction are generated on the yarn slivers. Absorption of glucose-containing sulfur dyestuff is performed in a dyeing process. An ammonia removal process is performed in a high-temperature and high-pressure tank so that residual ammonia in a fabric is evaporated. The evaporated ammonia is collected and then fed back to a mercerizing process for continuous use. The present invention also provides a production line including a spinning unit having a false twisting device, a dyeing unit configured to realize the dyeing process, and a liquid ammonia finishing unit consisting of a fabric mercerizing device, an ammonia removal device, an ammonia recycling device and a controller.

4 Claims, 2 Drawing Sheets

(51) Int. Cl.
*D06P 3/60* (2006.01)
*D06P 1/651* (2006.01)
*D06C 27/00* (2006.01)
*D06C 17/00* (2006.01)

(52) U.S. Cl.
CPC .......... *D06B 2700/27* (2013.01); *D06C 17/00* (2013.01); *D06C 2700/16* (2013.01); *D10B 2201/02* (2013.01)

(56) References Cited

U.S. PATENT DOCUMENTS

| | | | | | |
|---|---|---|---|---|---|
| 3,892,521 | A | * | 7/1975 | Dalle | D06B 19/00 8/619 |
| 3,915,632 | A | * | 10/1975 | Troope | D06B 7/08 8/125 |
| 3,942,948 | A | * | 3/1976 | Dalle | D06M 11/61 8/125 |
| 3,980,429 | A | * | 9/1976 | Lawrence | D06B 7/08 8/125 |
| 4,051,699 | A | * | 10/1977 | Carpenter, Jr. | D06B 7/08 26/27 |
| 4,074,969 | A | * | 2/1978 | Lawrence | D06B 19/00 62/115 |
| 4,801,303 | A | * | 1/1989 | Carlough | D06P 1/30 8/532 |
| 5,077,126 | A | * | 12/1991 | Green | D02G 3/442 428/373 |
| 2005/0268591 | A1 | * | 12/2005 | Tao | D01H 7/90 57/75 |
| 2014/0259456 | A1 | * | 9/2014 | Harris | D06P 5/001 8/445 |
| 2017/0088985 | A1 | * | 3/2017 | Goenka | A47G 9/0207 |

* cited by examiner

PRODUCTION PROCESS OF ENVIRONMENT-FRIENDLY DENIM FABRIC AND PRODUCTION LINE THEREOF

CROSS-REFERENCE TO RELATED APPLICATIONS

The present application claims the benefit of Hong Kong Patent Application No. 15100060.8 filed on Jan. 5, 2015, the contents of which are hereby incorporated by reference.

FIELD OF INVENTION

The present invention relates to the field of textiles, in particular to a production process of an environment-friendly denim fabric and a production line thereof.

BACKGROUND

It has been one and half centuries since the first jeans' birth in 1873. Jeans are working suits designed for Americans to deal with heavy daily work in the nineteenth century. After persistent development, jeans have become fashionable clothing and are popular all over the world. Now, denim products are not just limited to jeans. Denim clothing has a diversified development and the market thereof is growing. Since denim fabrics and clothes are suitable for all ages to wear and have high universality, they are fashionable clothes adored by consumers.

When denim clothes emerged in China, millions of Chinese consumers liked to wear denim clothes despite the seasons. According to incomplete statistics, denim fabrics produced in China every year have reached 2 billion meters, accounting for ¼ of the world production. Moreover, denim clothes produced in China every year are over 2.5 billion. China has become an important producing country of denim fabrics in the world.

However, as everyone knows, each piece of jeans is produced from cotton to finally become a fashionable and beautiful jeans clothing product through spinning, dyeing, weaving, finishing, garment forming and washing with water. Wherein, the spinning process is a key for product quality. Ring spinning is adopted generally in the existing technology, and conventional ring spinning refers to processes of rotatably introducing fiber slivers obtained after drafting of rough yarns through a ring-spinning steel wire ring and twisting cotton yarns into spun yarns. The winding speed of a bobbin is faster than that of the steel wire ring. Yarns are characterized by presenting conical helixes transferred inwards and outwards, wherein fibers are wound and connected inwards and outwards in the yarns, and thus the yarns are compact in structure and are strong. However, the conventional ring spinning process has the characteristic that the twist triangulation space is too long that a certain residual torque is formed by single yarns, which gives rise to larger biasfilling of the final fabric, and in case of poor control, a distortion situation will be formed in garment washing. Therefore, the wearing comfort level is reduced. In the traditional process, in order to improve such situation, the twisting degree of the yarns will be reduced generally. However, there will be certain limitations, such as reduction of spinnability, quality reduction of products and the like.

In the dyeing process, synthesized indigo dyes are used generally, and are substituted by sulfur dyestuff having similar firmness and performances due to single color, complicated production procedures and high cost. If containing previous powdered solid sulfur dyestuff, the sulfur dyestuff can be applied just by boiling and dissolving with sodium sulfide. However, sulfur dioxide gas will be released in this process, and the production process is not environment-friendly. The liquid sulfur dyestuff contains a certain amount of sodium sulfide reducing agent per se and shows a pre-reduced leuco compound form. But, relatively speaking, the sulfide content is relatively high, the purity of the dyestuff is low and is not easy to be oxidized, and thus the water consumption in production is high.

In the finishing process, a liquid ammonia mercerizing finish technology or an alkali mercerizing process will be applied. A method for removing ammonia by using steaming and washing with water in the traditional liquid ammonia mercerizing finish technology will produce a large amount of wastewater. A large amount of water needs to be consumed and a large amount of waste alkali is drained in the conventional alkali mercerizing process. Thus, the COD content in wastewater is high.

It can thus be seen that the production in each process aforementioned will generate different levels of energy source consumption, and especially the consumption of water resources by the denim fabrics acting as printing and dyeing products is most obvious. It is shown by data that 17980 liters of water needs to be consumed in the dyeing process of every 1000 pieces of jeans. Fresh water resources are lacking on the earth, and fresh water only accounts for 2.6% of the total water on the earth, including glacier, underground water and the like. Fresh water resources that can be used by human beings are actually very limited. Therefore, it is an urgent problem to be solved to produce the environment-friendly denim fabric in the industry while the product quality is ensured.

SUMMARY OF INVENTION

The features and the advantages of the present invention will be stated in the description hereinafter.

In order to overcome the problems of the existing technology, the present invention provides a production process of an environment-friendly denim fabric and a production line thereof. By improving the spinning process, the dyeing process and the ammonia removal process, electricity consumption, human resources, use of chemical products and water resources can be reduced.

To solve the problems mentioned above, the present invention adopts the follow technical solution:

According to one aspect of the present invention, a production process of the environment-friendly denim fabric is provided, comprising the following processes: spinning-→winding→dyeing→weaving on a loom→singeing→mercerizing→ammonia removal→sizing→weft straightening-→preshrinking→finish inspection→reeling; wherein, a false twisting process is added between the spinning process and the winding process, so that yarn slivers undergo excessive pre-tension in an axial direction, and twists which are the same in quantity but different in twisting direction are generated on the yarn slivers; and in the dyeing process, adsorption of glucose-containing sulfur dyestuff is performed in padding liquor of 60-90° C., and then color fixation is performed; the ammonia removal process is performed in a high-temperature and high-pressure tank for evaporating residual ammonia in a fabric, and the ammonia removal process also comprises a step of collecting the evaporated ammonia and then feeding the evaporated ammonia back to the mercerizing process for continuous use after the evaporated ammonia is cooled down and compressed.

According to one embodiment of the present invention, the ventilation time for dyestuff migration and diffusion is 30-60 seconds during the absorption of the sulfur dyestuff in the dyeing process.

According to one embodiment of the present invention, the dyeing process also comprises the steps: during the color fixation, adding acetic acid for preventing the dyestuff from falling after dissolving and adding sodium sulfate for preventing the dyestuff from being desorbed from fibers to a color fixation bath.

According to one embodiment of the present invention, in the dyeing process, the color temperature ranges from 70° C. to 75° C. and the color fixation time ranges from 40 seconds to 60 seconds.

According to one embodiment of the present invention, the dyeing process also comprises a water washing step: first washing with hot water, then washing with cold water and finally drying.

According to one embodiment of the present invention, ammonia is cooled down by using cold water in the ammonia removal process.

According to another aspect of the present invention, a production line of the environment-friendly denim fabric is provided, comprising:

a spinning unit having a spinning frame, a winding machine and a false twisting device, wherein the false twisting device is located between a front roller outlet and a yarn guide hook of the spinning frame and is configured to enable yarn slivers undergoing excessive pre-torsion in an axial direction and generate twists which are the same in quantity but different in twisting direction on the yarn slivers;

a dyeing unit configured to perform adsorption of glucose-containing sulfur dyestuff on yarns with the twists in padding liquor of 60-90° C. and then perform color fixation;

a loom unit configured to finish a process of weaving on a loom to produce a fabric; and a liquid ammonia finishing unit consisting of a fabric mercerizing device, an ammonia removal device, an ammonia recycling device and a controller, wherein the fabric mercerizing device is configured to enable fibers of the fabric to swell to achieve a mercerizing effect under certain temperature and tension and under dipping and action of ammonia; the ammonia removal device is configured to evaporate residual ammonia in the fabric; the ammonia recycling device is configured to collect evaporated ammonia and feed the evaporated ammonia back to the fabric mercerizing device for continuous use after the evaporated ammonia is cooled down and compressed; and the controller is configured to control various parameters of the ammonia recycling device.

According to one embodiment of the present invention, the false twisting device comprises two groups of twisting rolls and a false twister positioned between the two groups of twisting rolls, wherein each group of the twisting rolls consist of two twisting rolls which are arranged up and down and are reverse in rotating direction.

According to one embodiment of the present invention, the dyeing unit comprises one or two tie-dyeing tanks, two oxidation and color fixation tanks and two water washing tanks.

According to one embodiment of the present invention, the ammonia removal device is a high-temperature and high-pressure tank; and the ammonia recycling device comprises an ethylene glycol water cooler and a water cooling tower which are configured to cool down ammonia.

The person with ordinary skills in the art will better understand the features and the contents of these technical solutions after reading the description.

BRIEF DESCRIPTION OF THE DRAWINGS

The present invention will be described in detail by reference to the attached drawings and in conjunction with the embodiments. The advantages and the implementation modes of the present invention will be more apparent. Wherein, the contents as shown in the attached drawings are just for the purpose of illustrating the present invention, but not limiting the present invention.

DETAILED DESCRIPTION OF THE PREFERRED EMBODIMENTS

Figure 1:
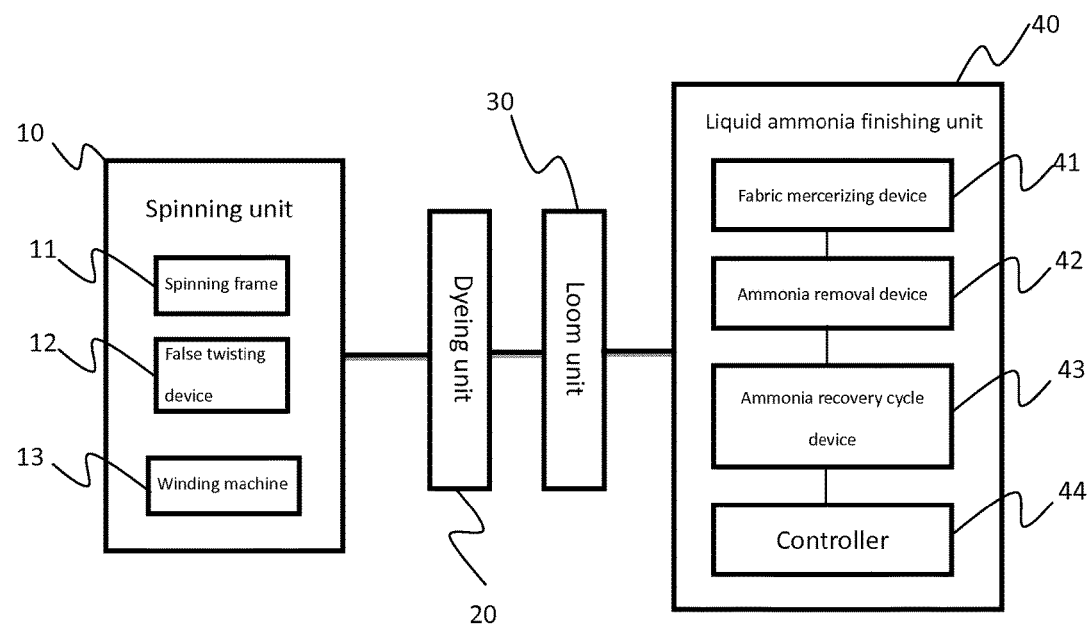
FIG. 1 is a structural diagram of the production line of the environment-friendly denim fabric in one embodiment of the present invention.

The present invention provides a production process of environment-friendly denim fabric, comprising the following processes: spinning→winding→dyeing→weaving on a loom→singeing→mercerizing→ammonia removal→sizing→weft straightening→preshrinking→finish inspection-→reeling; wherein, a false twisting process is added between the spinning process and the winding process, so that yarn slivers undergo excessive pre-tension in an axial direction, and twists which are the same in quantity but different in twisting direction are generated on the yarn slivers; in the dyeing process, adsorption of glucose-containing sulfur dyestuff is performed in padding liquor 60-90° C., and then color fixation is performed; the ammonia removal process is performed in a high-temperature and high-pressure tank for evaporating residual ammonia in a fabric, and the ammonia removal process also comprises a step of collecting the evaporated ammonia and then feeding the evaporated ammonia back to the mercerizing process for continuous use after the evaporated ammonia is cooled down and compressed.

To be specific, the spinning process and the winding process are finished by adopting a low-twist yarn production process, and in consistency with the conventional ring spinning process, the low-twist yarn production process comprises: cotton cleaning, cotton carding, first drawing, second drawing, roving, spinning and winding. The difference therebetween is that a low twist effect is achieved by means of a false twisting manner in the present invention. The false twisting means that both ends of yarns are controlled in a spinning process, and twisting is performed between the both ends, so that the yarn slivers undergo excessive pre-torsion in an axial direction, fiber arrangement is changed to a greater extent, and the torsion angle of the fibers is increased by times, which give rise to torque reduction, even disappearance of finished-product yarns to achieve the torque balance. Meanwhile, twists which are the same in quantity but different in twisting direction can be generated on the yarn slivers to increase the strength with a section having the same designed twisting direction as that of the yarn slivers (namely the strength of the roving and spinning section), but the other section (namely the roving and winding section) generates untwisting to finally keep the designed twisting degree.

Furthermore, the twisting degree between a front nip of the yarn slivers and a false twisting point is increased remarkably by adopting a false twisting manner. The length of the triangulation space is greatly shortened, the dynamic tension of yarns slivers in the spinning section drops, and the occurrence probability of end breakage of spun yarns is effectively reduced. The triangulation space is shortened, so that the fibers discharged from a nip line are drawn into the yarn slivers fast and effectively. The situation that the tail ends of the fibers are exposed is reduced and the length of hairiness is shortened.

The low-twist yarn production process has the main characteristics including: the inclination angles of the fibers in single yarns are small; the fibers are mainly distributed in the inner layers of the single yarns, and the single yarns have a structure tight inside and loose outside; the inner-layer fibers reach the maximal distribution density; a low-twist coefficient about 250 is available for the low-twist yarn production technology, whereas the common ring spinning process has the low-twist coefficient generally about 370 (common carding); compared with traditional ring-spun yarns, the low-twist yarn variety has the characteristics of small single yarn torque, low torsion shrinkage, plush hand-feel, and small deflection of the finish-product fabric; and compared with common ring spinning technology, the low-twist yarn production technology has the benefits that the electricity consumed for producing yarns of the same yield can be saved by about 30% and a remarkable energy-saving advantage is achieved.

By taking a product with the count number of Ne16 as an example, the comparisons of the actual production efficiency and the energy consumption situations between the common ring-spun yarns and low-twist yarns are as shown in Table 1 as follows:

TABLE 1

|  | Common ring-spun yarns 16s | Low-twist yarns 16s |
| --- | --- | --- |
| monthly output | 10.6 T | 11.8 T |
| Electricity consumption | 9855 kWH | 8085 KWH |

As shown by these data, in comparison to those of common ring-spun yarns, the production efficiency of the low-twist yarns is improved by 11%, the energy consumption is reduced by about 26% under the condition of the same output, and the energy-saving effect on electric energy sources is obvious. In addition, the strength of the low-twisted yarns is much higher on the basis of the same yarn counts. In terms of 16s yarns, the fiber length of the common ring-spun yarns is 1.25 inch and the yarn strength thereof is 27.6 cN; whereas the fiber length of the low-twisted yarns is 1.15 inch and the yarn strength thereof can reach 32.1 cN.

The dyeing process comprises the following steps: performing absorption of sulfur dyestuff by padding Diresul RDT dyestuff in liquor at 60-90° C., i.e. enabling the dyestuff and fibers to undergo contact adsorption, wherein the ventilation time for dyestuff migration and diffusion is about 30-60 seconds in this process for a purpose of ensuring enough time to enable the dyestuff to transfer into the fibers; and performing color fixation at 70-75° C. for 40-60 seconds, wherein acetic acid is added in the color fixation stage for preventing the dyestuff from falling by dissolving and providing a required pH value for an oxidant (Diresul Oxidant BRI liq), and by the latter, anthraquinone groups are formed in dyestuff molecules to generate a final color in an oxidized stage, i.e. the quinone groups are oxidized and color-developed by means of the oxidant to generate a final color in the color fixation stage, and mercaptan groups and fibers undergo covalent bonding through a color fixing agent, for example, a cationic color fixing agent (Indosol E-50 liq) reacts with sulfydryl and fibers in the dyestuff, and the dyestuff is subjected to color fixing by means of ionic bonds. In this process, sodium sulfate and a dispersing agent (Ekaline F liq.) need to be added, wherein the sodium sulfate can be used to prevent the dyestuff from being desorbed to a color fixing bath from the fibers; and finally, washing with water and drying for purposes of removing salts attached in the production process and neutralizing the salts, wherein washing with water and drying are preformed according to the steps: washing with hot water first, then washing with cold water and finally drying. Because the characteristic of the Diresul RDT dyestuff adopted in the present invention realizes 100% color fixation, no floating color is generated and no a large amount of water is required for washing, and thus the purposes of environmental friendliness and energy saving are achieved.

Liquid sulfur dyestuff Diresul RDT is adopted by the present invention to continuously dye cotton warp yarns instead of traditional indigo dyestuff. The conventional denim indigo dyeing process is complicated, wherein the 8-10 procedures of dipping in padding liquor and oxidizing for color fixation need to be performed repeatedly in a dye vat (an indigo leuco body solution reduced by caustic soda sodium hydrosulfite). Washing with water for three times is performed finally to remove floating color. Drying is performed at last to achieve a dyeing effect. In addition, the indigo dyestuff has poor affinity to cotton fibers and is low in dyeing temperature and difficult in dye uptake. A continuous dyeing method of padding and oxidizing for multiple times at low concentration and low temperature is adopted generally, and a required dyeing depth can be achieved after 8-10 times of performing this method. In the present invention, the complicated dyeing procedures in conventional denim dyeing are reduced, and the same denim washed style is achieved at better product quality.

To be specific, the sulfur dyestuff used in this process is 20% pre-reduced dyestuff made of glucose and alkali instead of sodium sulfate and alkali, wherein a macromolecular structure contains quinone groups determining the final color phase and mercaptain groups in charge for dissolving and color fixation. As can be seen from the chemical reaction mechanism, it is mainly because of the dyestuff molecule structure and sizes of dyestuff molecules (almost macromolecular size) which are easily captured by fibers to generate a chemical reaction. Relative to common liquid sulfur dyestuff, the sulfur dyestuff used in this process has no polysulfur bonds, and is thus lower in sulfur content, higher in stability, free of undesirable odor (sulfur dioxide) in the production process, and obviously low in water consumption amount during production and is more environment-friendly. The dyeing process is called as an oxygen compression process where water consumption is low mainly because a step of water washing before oxidizing is omitted, wherein 90% of water can be saved compared with that of a conventional dyeing process; and in addition, no color residual is present in wastewater, the process is simple and the energy consumption of equipment is low. Because an RDT process comprises the following steps: padding in liquor for a purpose of enabling the dyestuff and fibers to undergo contact adsorption; ventilating for a purpose of ensuring enough time to enable the dyestuff to transfer into the fibers; color fixing for a purpose of enable the quinone groups to oxidize and color-develop by means of an oxidant to generate a final color and enabling mercaptan groups and fibers to undergo covalent bonding by means of a color fixing agent; and washing with water for a purpose of removing salts attached in the production process and neutralizing the salts. Because the characteristic of the Diresul RDT dyestuff adopted in the present invention realizes 100% color fixation, no floating color is generated and no a large amount of water is required for washing, and thus the purposes of environmental friendliness and energy saving area achieved.

Compared with the conventional denim indigo dyeing process, the present invention optimizes the procedure of repeatedly padding and oxidizing. The process is greatly shortened, and relative to the conventional denim indigo dyeing process, 8 vats are reduced in the present invention, wherein the volume of each dye vat is 1500 L. Consumption of water resources is effectively reduced, and in addition, the electricity consumption is correspondingly reduced because of reduction of transmission devices. Furthermore, the occurrence probability of production quality problems is reduced because the process is shortened. Specific energy source consumption and wastewater parameters are as shown in Table 2 as follows:

TABLE 2

|  | conventional indigo dyeing process | process provided by the present invention |
|---|---|---|
| water resource consumption | 89900 L | 44780 L |
| electricity resource consumption | 9180 Kwh | 7435 kWH |
| cotton consumption | 214 kg | 94 kg |
| wastewater production | 83570 L | 38450 L |
| components of wastewater | 160 kg sulfate + 80 kg sulfite + 10 kg chloride | 3 kg sulfate + 1 kg chloride |
| COD of wastewater | 19 kg | 3 kg |
| BOD of wastewater | 11 kg | 2 kg |

As can be seen from the data above, water resources are saved by 50% in a Denim OX process, electricity resources are saved by 20% and wastewater production is reduced by 50% compared with those of the conventional denim indigo dyeing process. The Denim OX process has a significant meaning in terms of contribution to environment influence. Wherein, the cotton consumption mainly refers to falloff of short fibers in the production process.

The fabric subjected to pretreatments, such as singeing and desizing, will enter a mercerizing process of a liquid ammonia mercerizing machine. Cropping and dipping are important ports in the mercerizing process. The fibers of the fabric are swelled under the actions of certain temperature and tension as well as dipping and action of ammonia, and thus a mercerizing effect is achieved. The cotton fibers generate slight swelling under the action of liquid ammonia, and such swelling, after alkali mercerizing and ammonia treatment, has the difference residing in that the fabric shows a bright luster on the surface by means of alkali mercerizing, however, the fabric shows a silk effect by means of ammonia treatment and accordingly has better handfeel and softness.

After dipping of ammonia, the fabric still needs to react for a certain time. In the meanwhile, ammonia in the fabric needs to be removed in time. Therefore, the fabric enters an ammonia removal process. In the existing technology, a method of neutralizing by using sulfuric acid is used to remove ammonia on the fabric; i.e. the sulfuric acid is added in the water washing process to react with residual ammonia in the fabric, and finally an ammonia removal purpose is achieved. According to such process of removing ammonia by sulfuric acid, the water consumption is large, and the wastewater treatment difficulty is increased because the concentration of ammonia in wastewater is increased due to the use of the sulfuric acid, and meanwhile, the treatment cost is also increased. Furthermore, problems, such as ammonia leakage, are also present in the production process. Because ammonia molecules are smaller than molecules of caustic soda, the permeation of caustic soda to fibers fails to reach the depth of ammonia permeation, and this will make the treatment more uniformly, regularly, effectively and homogeneously. The fabric will not be gradually shrunk in a process of washing with water, and the color will not changed yet.

A high-temperature ammonia removal technology is used in the present invention, which is the core of anhydrous mercerizing. Specifically, residual ammonia in the fabric is evaporated out by using steam in a high-temperature and high-pressure tank. Therefore, the ammonia will be collected and recycled after being cooled, wherein the ammonia is cooled with cold water in the present invention, and an ethylene glycol water cooler and a water cooling tower may be adopted. Various parameters in the mercerizing process and the ammonia removal process can be controlled and displayed through a controller, wherein the controller also comprises an ammonia concentration detection portion. The liquid ammonia mercerizing technology applied in this process solves the problems of water consumption during mercerizing and wastewater treatment, and the fibers of the fabric are swelled to achieve a mercerizing effect under the action of ammonia after dipping with liquid ammonia, whereas no water is consumed and residual ammonia in the fabric is evaporated out at high temperature and high pressure in the ammonia removal process, and the evaporated-out ammonia is then cooled and compressed after being collected by a circulating system to return to the mercerizing process for repeated use. Compared with the traditional alkali mercerizing process, the anhydrous liquid ammonia mercerizing process has remarkable advantages in terms of energy saving, emission reduction and cost. The ammonia recovery and cyclic utilization rate reaches over 95%, and 0.1-0.13 kg of COD emission can be reduced every hundred meter of fabric. Compared with the traditional alkali mercerizing process, the emission of pollutants generated during ammonia mercerizing is close to zero.

TABLE 3

|  | alkali mercerizing | liquid ammonia mercerizing | remarks |
|---|---|---|---|
| caustic soda concentration (g/L) | 220-250 | — |  |
| caustic soda consumption (kg/100 m) | 30-35 | — |  |
| water consumption (m³/100 m) | 1.3-1.4 | 0.014 | cooling water is used for liquid ammonia mercerizing |
| liquid ammonia consumption (kg/100 m) | — | 3.66 |  |
| caustic soda emission (kg/100 m) | 3.2 | — | The emission is 8.1 kg/100 m in case of no alkali recovery when the alkali recovery rate reaches 60%. |

TABLE 3-continued

|  | alkali mercerizing | liquid ammonia mercerizing | remarks |
|---|---|---|---|
| pH value of wastewater | >12 | — | |
| COD of wastewater (mg/L) | 2000-3000 | — | |

As can be seen from the data above, 1.3 m³ water consumption, 0.1-0.13 kg of COD emission and consumption of sulfuric acid in the wastewater treatment process are reduced in the ammonia mercerizing process, and thus the ammonia mercerizing process has a remarkable environmental benefit. Compared with the traditional alkali mercerizing process, the ammonia mercerizing process achieves a better mercerizing effect on the premise of not wasting water resources, and meanwhile, the production of printing and dyeing wastewater is also reduced.

Figure 2:
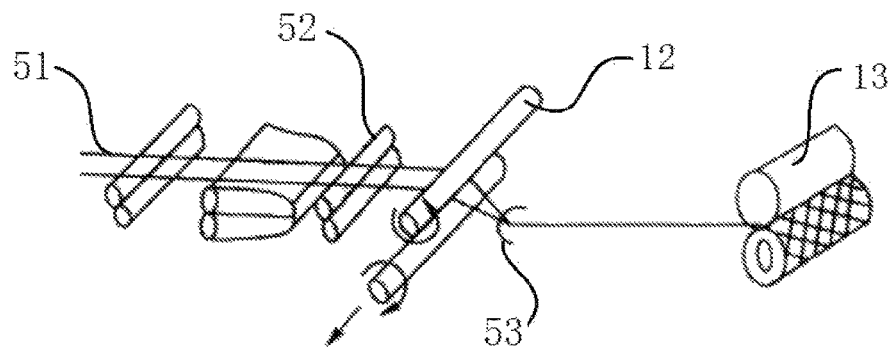
FIG. 2 is a partial structural diagram of the spinning unit in one embodiment of the present invention.

As shown in FIG. 1 and FIG. 2, the production line of the environment-friendly denim fabric is characterized by comprising a spinning unit 10 consisting of a spinning frame 11, a winding machine 12 and a false twisting device 13, wherein the false twisting device 12 is located between a front roller 52 outlet and a yarn guide hook 53 of the spinning frame 11 and is configured to enable yarn slivers to undergo excessive pre-torsion in an axial direction and generate twists which are the same in quantity but different in twisting direction on the yarn slivers; a dyeing unit 20 configured to perform adsorption of glucose-containing sulfur dyestuff on yarns with the twists in 60-90° C. padding liquor and then perform color fixation; a loom unit 30 configured to finish a process of weaving on a loom to produce a fabric; and a liquid ammonia finishing unit 40 consisting of a fabric mercerizing device 41, an ammonia removal device 42, an ammonia recycling device 43 and a controller 44, wherein the fabric mercerizing device 41 is configured to enable fibers of the fabrics to swell to achieve a mercerizing effect under the actions of certain temperature and tension as well as dipping and action of ammonia; the ammonia removal device 42 is configured to evaporate residual ammonia in the fabric out; the ammonia recycling device 43 is configured to collect evaporated-out ammonia and feed the evaporated-out ammonia back to the fabric mercerizing device for continuous use after being cooled and compressed; and the controller 44 is configured to control various parameters of the ammonia recycling device.

With regard to the spinning unit 10, an accessory device is additionally arranged on a ring spinning frame, namely a set of false twisting device 12 is additionally arranged between the front roller 52 outlet and the yarn guide hook 53 of the spinning frame, so that fibers 51 output by the front roller accept a false twist first before obtaining true twists, the spinning process is operated through the false twisting device 12, and therefore, the fiber tension redistribution of the spinning triangular zone is caused to change the form as well as arrangement and distribution of fibers in single yarns, and thus the structure of the yarns undergoes a great change to achieve a low-twist effect.

Figure 3:
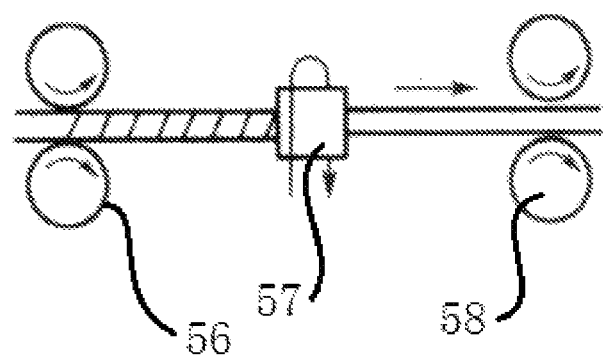
FIG. 3 is a structure diagram of the false twisting device in one embodiment of the present invention.

As shown in FIG. 3, the false twisting device 12 comprises two groups of twisting rolls 56 and 58 as well as a false twister 57 positioned between the two groups of twisting rolls, wherein each group of twisting rolls consists of twisting rolls which are arranged up and down and are reverse in rotating direction. A spindle for twisting in conventional ring spinning need to reach a certain number of revolutions, or the quality situations, such as end breakage, will be caused. After the false twisting device is additionally arranged, the requirement on the number of revolutions will be very lower. The load of a motor of the device is greatly lightened, and thus an electricity saving effect is achieved. In addition, the production efficiency and the product quality are also improved. The low-twisted yarn production technology is adopted to provide softer and more comfortable clothing applicability. As shown in Table 1 above, the production efficiency is improved, and meanwhile the consumption of resources, such as electricity and human resources is also reduced.

During specific implementation, the dyeing unit 20 comprises one or two tie-dyeing tanks, two oxidation and color fixation tanks and two water washing tanks; whereas 8 to 10 tie-dyeing tanks and 3 to 4 water washing tanks are required in the traditional denim dyeing technology; and the dyeing unit 20 is configured to realize the dyeing process, and as shown in Table 2, the consumption of water, electricity, chemical products and the like and the production of printing and dyeing wastewater can be greatly reduced while the production process is shortened.

The fabric mercerizing device 41 is configured to realize the mercerizing process, the ammonia device 42, the ammonia recycling device 43 and the controller 44 are configured to realize the ammonia removal process, and in this embodiment, a high-temperature and high-pressure tank is adopted as the ammonia removal device 42 and is configured to evaporate ammonia in the fabric out by input steam; and the ammonia recycling device 43 also comprises an ethylene glycol water cooler and a water cooling tower which are configured to cool ammonia.

Compared with related equipment used in traditional alkali mercerizing, the liquid ammonia finishing unit 40 is used to enable the treated denim fabric to obtain better finishing quality, and the fabric has incomparable dyeing evenness and shows stronger plasticity and ductility at the same time, and thus the life and the 'new' appearance of clothes are prolonged and maintained. In addition, the whole process is at a sealed space, so that water, air and ammonia gas are separated and recycled easily under vacuum isolation. The recovery rate of ammonia reaches over 95%, and the emission of wastewater and waste gas is close to zero. The cost of production materials and the damage to the environment in the production process are greatly reduced.

Of course, the production line of the environment-friendly denim fabric provided by the present invention also comprises other equipment configured to realize the singeing process, the sizing process, the weft straightening process, the pre-shrinking process, the finish inspection process, the reeling process and the like aforementioned, the production equipment in these processes are the same as those in the existing technology, and will not be illustrated one by one here.

Relative to the traditional denim production process, the production process of the environment-friendly denim fabric and the production line thereof can save the electricity by about 300 KW and water consumption by 170 tons (calculated according to every 10000 meters), improve the production efficiency and save the human resources; in the meanwhile, the use amount of the chemical products is reduced, the emission of wastewater and pollutants is reduced, the softness of the denim fabrics is promoted, and thus the denim fabric is more comfortable.

The present invention is based on environment-friendly raw materials, wherein BCI (Better Cotton Initiative) cottons or organic cottons having GOTS certification can be adopted as required, and the planting of cottons in the world is conductive to cotton planters, particular to the planting environment, and more particularly to the future development of this industry by combining the BCI cottons adopted as the raw materials. The BCI cottons own 6 major principles and 44 standards, including furthest reducing the harmful effects generated by crop protection measures, effectively using water resources, caring for soil health, protecting the survival environment, caring for and protecting the fiber quality, raising the productivity, promoting decent work of the cotton farmers, improving the economic conditions of the cotton farms and farm workers and the like. Therefore, promotion and increase of use of the BCI cottons have a great meaning to utilization and protection of environment resources, and the organic cottons are more environment-friendly to a greater extent and have fewer harms to the human beings and the environment compared with the BCI cottons.

The preferred embodiments of the present invention are illustrated as above by reference to the attached drawings. Multiple transformation solutions can be made by those skilled in the art, without departing from the scope and the essence of the present invention, to realize the present invention. For instance, partially indicated or described features of one embodiment can be used in another embodiment so as to obtain a further embodiment. Those stated above are just preferred feasible embodiments of the present invention and are thus not to limit the protection scope of the present invention. Equivalent transformations made by use of contents of the description and the attached drawings of the present invention should fall within the protection scope of the present invention.

What is claimed is:

1. A production line of a denim fabric, comprising:
   a spinning unit having a spinning frame, a winding machine and a false twisting device, wherein the false twisting device is located between a front roller outlet and a yarn guide hook of the spinning frame and is for excessive pre-torsion of yarn slivers in an axial direction and generating twists which are the same in quantity but different in twisting direction on the yarn slivers;
   a dyeing unit configured to perform adsorption of glucose-containing sulfur dyestuff on yarns with the twists in padding liquor of 60-90° C. and then perform color fixation;
   a loom unit configured to perform a process of weaving to produce a fabric; and
   a liquid ammonia finishing unit consisting of a fabric mercerizing device, an ammonia removal device, an ammonia recycling device and a controller, wherein the fabric mercerizing device is configured to enable fibers of the fabric to swell to achieve a mercerizing effect under certain temperature and tension and under dipping and action of ammonia; the ammonia removal device is configured to evaporate residual ammonia in the fabric; the ammonia recycling device is configured to collect evaporated ammonia and feed the evaporated ammonia back to the fabric mercerizing device for continuous use after the evaporated ammonia is cooled down and compressed; the controller is configured to control various parameters of the ammonia recycling device.

2. The production line of the denim fabric according to claim 1, wherein the false twisting device comprises two groups of twisting rolls and a false twister arranged between the two groups of twisting rolls, wherein each group of the twisting rolls consists of two twisting rolls which are arranged up and down and are reverse in rotating direction.

3. The production line of the denim fabric according to claim 1, wherein the dyeing unit comprises one or two tie-dyeing tanks, two oxidation and color fixation tanks and two water washing tanks.

4. The production line of the denim fabric according to claim 1, wherein the ammonia removal device is a high-temperature and high-pressure tank; the ammonia recycling device comprises an ethylene glycol water cooler and a water cooling tower configured to cool down ammonia.

\* \* \* \* \*